(12) United States Patent
Tefft et al.

(10) Patent No.: US 6,623,975 B1
(45) Date of Patent: Sep. 23, 2003

(54) METHOD AND SYSTEM FOR VEHICLE EMISSION TESTING

(75) Inventors: Robert J. Tefft, Crestwood, KY (US); S. Jay Gordon, Louisville, KY (US); Clifton Mahaffey, Louisville, KY (US)

(73) Assignee: Gordon-Darby Systems, Inc., Louisville, KY (US)

( * ) Notice: Subject to any disclaimer, the term of this patent is extended or adjusted under 35 U.S.C. 154(b) by 0 days.

(21) Appl. No.: 09/851,192

(22) Filed: May 8, 2001

Related U.S. Application Data
(60) Provisional application No. 60/202,958, filed on May 9, 2000.

(51) Int. Cl.$^7$ .................. G01N 33/22; G01N 33/00; G01L 3/26
(52) U.S. Cl. .................. 436/137; 436/127; 73/116
(58) Field of Search .................. 436/137, 127; 73/23.31, 116

(56) References Cited

U.S. PATENT DOCUMENTS

| | | | |
|---|---|---|---|
| 5,524,476 A | 6/1996 | Tedeschi | |
| 5,621,166 A | 4/1997 | Butler | |
| 5,719,396 A | 2/1998 | Jack et al. | |
| 5,729,452 A | 3/1998 | Smith et al. | |
| 5,753,185 A | 5/1998 | Mathews et al. | |
| 5,835,871 A | 11/1998 | Smith et al. | |
| 5,918,256 A | 6/1999 | Delaney | |
| 5,964,812 A | 10/1999 | Schumacher et al. | |
| 6,016,690 A | 1/2000 | Cook et al. | |
| 6,044,314 A | 3/2000 | Cook et al. | |
| 6,112,574 A | * 9/2000 | Hirano et al. ............ 73/23.31 |
| 6,112,575 A | * 9/2000 | Cocconi ................... 73/23.31 |
| 6,151,952 A | * 11/2000 | Mathews et al. .......... 73/23.31 |
| 6,387,706 B1 | * 5/2002 | Eden ......................... 436/127 |

* cited by examiner

Primary Examiner—Jill Warden
Assistant Examiner—Brian Sines
(74) Attorney, Agent, or Firm—Stites & Harbison, PLLC; David W. Nagle, Jr.

(57) ABSTRACT

A method and system for vehicle emission testing measures pollutant concentration, but then provides for conversion of the measured pollutant concentration into its corresponding pollutant mass, thereby allowing for the calculation of a vehicle's emission test scores for one or more common pollutants in units of mass per distance. Through the use of the method and system of the present invention, significantly more accurate results can be obtained as compared to prior art test methods, and without the implementation, operating, and maintenance costs of comparable test methods.

6 Claims, 3 Drawing Sheets

METHOD AND SYSTEM FOR VEHICLE EMISSION TESTING

This application claims priority from U.S. provisional application No. 60/202,958 filed May 9, 2000. This application relates to a method and system for vehicle emission testing. The entire disclosure contained in U.S. provisional application No. 60/202,958 is incorporated herein by this reference.

BACKGROUND OF THE INVENTION

Vehicle emissions have long been identified as a major contributor to air pollution. As such, in geographical areas having particularly poor air quality, the United States federal government, through the Environmental Protection agency ("EPA"), has mandated vehicle emission inspection and maintenance programs. The intent or objective of these vehicle emission inspection and maintenance programs is to identify vehicles which are no longer performing acceptably, i.e., vehicles which are releasing more polluting emissions than is acceptable. Vehicles identified as not performing acceptably must then be appropriately repaired.

In implementing vehicle emission inspection and maintenance programs, various apparatus, methods, and testing protocols have been developed and are being used across the United States. In this regard, the local municipality or similar governing body normally makes the decision as to which apparatus, method, and/or protocol to employ. For example, some municipalities have opted for centralized testing locations, others have opted for decentralized testing locations, and still others have opted for a hybrid centralized/decentralized systems. In most cases, the ultimate decision as to which apparatus, method, and/or protocol to employ depends on a combination of factors, including, for example: practicality, costs, and input from interested third parties. Thus, there are often wide variations between the apparatus, methods, and/or protocols employed in different geographic areas. Such variations often result in differences in the reliability and accuracy of the testing, along with differences in the amount of labor and skill required to conduct the testing and to maintain the equipment associated with that testing.

A few of the simpler vehicle emission test methods are: (1) the Idle Mode Test, which measures emissions from an idling vehicle; and (2) the Loaded Mode Test, which measures emissions from vehicles driven at a constant speed. Although these two tests provide general baseline information regarding vehicle emissions, they are not representative of "real world" driving. As a result, both the Idle Mode Test and the Loaded Mode Test often tend to produce false positives. In other words, a vehicle might pass the Idle Mode Test or Loaded Mode Test even though that vehicle is not in compliance with federal guidelines. Quite clearly, such testing failures are potentially detrimental to the air quality of a geographic area because vehicles which require repair are not appropriately identified, thus allowing for excessive release of polluting emissions.

To address these problems, more rigorous test methods and protocols have been developed, including the Acceleration Simulation Mode (ASM) concentration test and Transient Mass Emission Inspections (TMEI). Such test methods are clearly preferred as compared to the Idle Mode Test and the Loaded Mode Test; however, along with improved performance comes increased costs.

First, the ASM concentration test can be used in both centralized and decentralized testing programs. In an ASM concentration test, vehicles are driven at a fixed speed under a heavy load. Nevertheless, because the vehicles are artificially loaded, false failures can result. In other words, a vehicle might fail the ASM concentration test even though that vehicle is in compliance with federal guidelines. Although false failures are not detrimental to the air quality of a geographic area, a false failure can be costly to the vehicle owner who must have the vehicle examined at a repair or maintenance facility, and then must have the vehicle re-tested. Furthermore, a high percentage of false failures tends to result in public distrust of vehicle emission testing.

Among the most advanced and accurate test methods are Transient Mass Emission Inspections (TMEI), such as the IM240 and IM147. In TMEI, a vehicle is tested at a variety of velocities, accelerations, and decelerations. These velocities, accelerations, and decelerations (collectively referred to as a "drive trace") are representative of "real world" driving conditions and engine loads. For example, an IM240 test includes a series of accelerations, decelerations and speeds ranging from zero miles per hour (MPH) to fifty-six MPH over a 240-second testing period. For the duration of the testing period, emissions, including hydrocarbons (HC), carbon monoxide (CO), carbon dioxide ($CO_2$), and the oxides of nitrogen ($NO_x$), are individually accumulated over the drive trace and normalized for the distance traveled. This recorded mass per distance, normally reported as grams per mile (GPM), is then reported as the vehicle's test score. The vehicle's test score for each accumulated pollutant is compared to a federally defined standard for that vehicle and that particular pollutant. A score exceeding the defined standard is considered a failure.

Thus, since pollutant mass is measured in TMEI, as opposed to pollutant concentration (Idle Mode, Loaded Mode and ASM testing), a more accurate determination of the vehicle emission characteristics can be generated. Nevertheless, TMEI have some shortcomings. Conventional TMEI do not lend themselves well to decentralized testing. Furthermore, they are inherently complex and costly to implement, operate, and maintain.

It is therefore a paramount object of the present invention to provide a method and system for vehicle emission testing that relies on transient test drive traces with "real world" velocities, accelerations, decelerations, and loading, a method and system that provides a measurement of pollutant mass rather than pollutant concentration, yet has relatively low implementation, operating, and maintenance costs.

This and other objects and advantages of the present invention will become apparent upon a reading of the following description.

SUMMARY OF THE INVENTION

This present invention pertains to a method and system for vehicle emission testing. The method and system of the present invention relies on transient test drive traces with "real world" velocities, accelerations, decelerations and loading. More importantly, however, although the method and system of the present invention measures pollutant concentration, it provides for conversion of the measured pollutant concentration into its corresponding pollutant mass, thereby allowing for the calculation of a vehicle's emission test scores for one or more common pollutants in units of mass per distance. Through the use of the method and system of the present invention, significantly more accurate results can be obtained as compared to prior art test methods, and without the implementation, operating, and maintenance costs of comparable test methods.

DETAILED DESCRIPTION OF THE PRESENT INVENTION

The present invention is a method and system for vehicle emission testing that relies on transient test drive traces with "real world" velocities, accelerations, decelerations and loading, a method and system that converts measured pollutant concentration into its corresponding pollutant mass at relatively low implementation, operating, and maintenance costs. Specifically, the method and system of the present invention allows for the calculation of a vehicle's emission test scores for one or more common pollutants in units of mass per distance for subsequent comparison of each such test score to a standard to determine if the vehicle has passed or failed the emissions test. Through the use of the method and system of the present invention, significantly more accurate results can be obtained as compared to Idle Mode, Loaded Mode, and ASM testing, but without the implementation, operating, and maintenance costs of TMEI.

In implementing the method and system of the present invention, it is necessary to obtain and use a reference data set. Specifically, the method and system of the present invention relies upon characteristic exhaust flow factors that are specific to selected attributes of the vehicle being tested (including, but not limited to make, model, and/or year), thus allowing for a measurement of pollutant concentration to be computationally converted to a measurement of pollutant mass. However, calculation of the requisite characteristic flow factors requires reliance on a reference data set.

In the preferred embodiment of the present invention as described herein, the requisite reference data set was compiled through the TMEI program in Maricopa County, Ariz. Specifically, the reference data set is comprised of a random, representative sample of the actual emissions testing records from the TMEI program in Maricopa County, Arizona. Each record in the reference data set identifies the tested vehicle by make, model, year, manufacturer, inertia weight, and engine displacement. Each record further provides the constant volume sampling (CVS) flow and drive trace associated with the test, as will be further described below, along with the actual results of the test—the measured pollutant masses for the tested vehicle for each second of the drive trace.

This particular reference data set was selected because the Maricopa County TMEI program is widely recognized within the industry for the accuracy and consistency of its testing, and thus often serves as a standard against which other vehicle emissions tests are compared. Nevertheless, the use of this particular data set is not intended to be limiting, but for illustrative purposes only. Other reference data sets may be also be used in accordance with the present invention without departing from the spirit and scope of the present invention.

Figure 1:
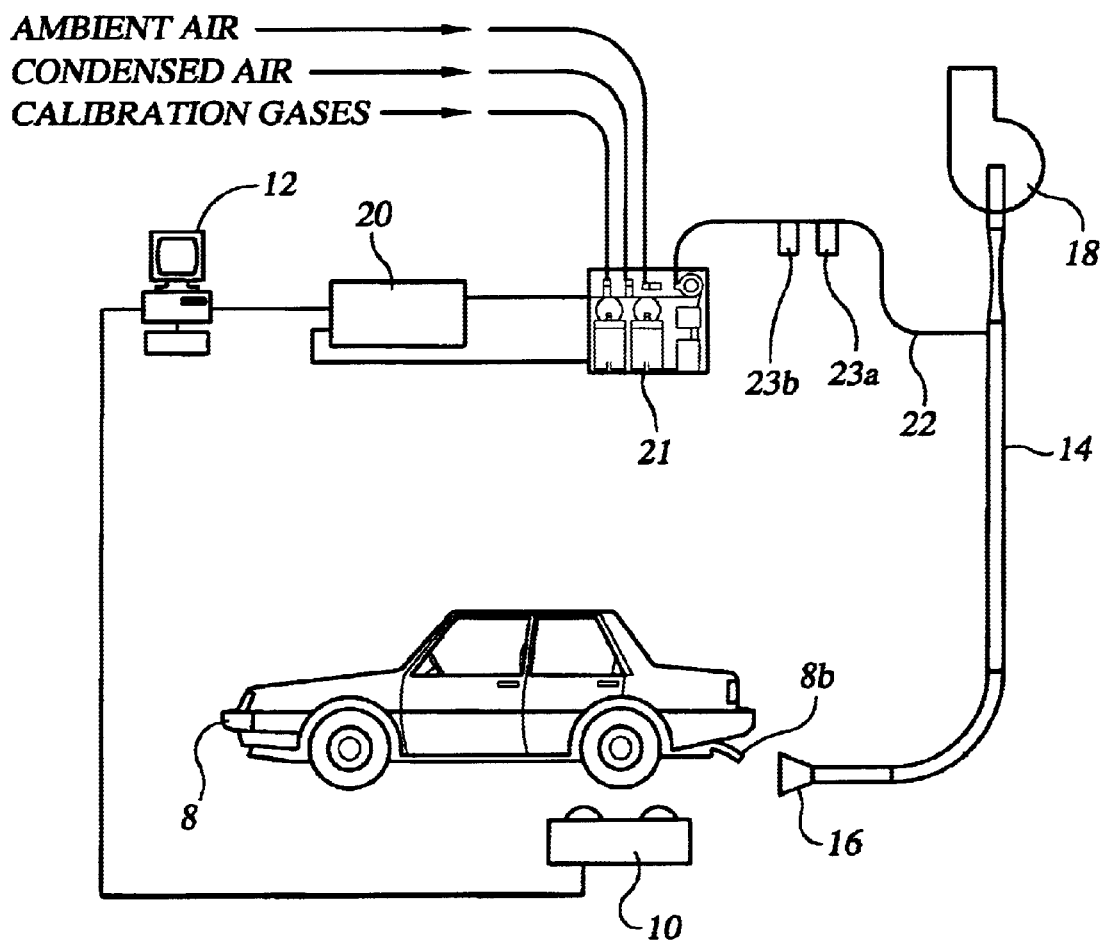
FIG. 1 is a schematic view of the equipment involved in typical prior art Transient Mass Emission Inspections ("TMEI")
Figure 1A:
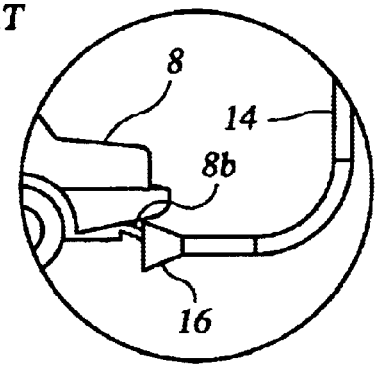
FIG. 1a is an enlarged view of the fitting of an emissions collection vent with a conical inlet port over the tailpipe of the vehicle to be tested in typical prior art Transient Mass Emission Inspections ("TMEI")

As mentioned above, the Maricopa County TMEI program is widely recognized within the industry for the accuracy and consistency of its testing. Referring now to FIGS. 1 and 1a, the equipment involved in testing in the Maricopa County TMEI program includes: (1) a dynamometer and associated controller 10 operably connected to a computer 12 or similar microprocessor which is programmed to generate a drive trace that replicates "real world" velocities, accelerations, decelerations, and loading; (2) a constant volume sampling (CVS) system generally comprised of an emissions collection vent 14 with a conical inlet port 16 and a high-pressure blower 18; and (3) a series of analyzers 20 for detection of various pollutants or other emissions, e.g., HC, CO, $CO_2$, and $NO_x$, said analyzers 20 being in gaseous communication with a sample and calibration gas control system 21, which in turn is operably connected to the CVS system by one or more sampling lines 22. Of final note, the system may also include one or more sample filters 23a, 23b. The primary filter 23a removes extraneous materials, such as rust pieces, that are drawn into the collection vent 14. The secondary filter 23b removes smaller extraneous materials that were able to pass through the primary filter 23a. In general, such filters are employed to extend the life of the testing equipment and to ensure the accuracy of the testing process.

In this prior art test method and system, since the conical inlet port 16 of the collection vent 14 fits around the tailpipe 8b of the vehicle 8 being tested, the extracted tailpipe emissions sample includes essentially all of the vehicle's tailpipe emissions. The blower 18 also introduces some ambient air into the sample, turbulently homogenizing the mixture of raw emissions and ambient air so that the ambient air dilutes the tailpipe emissions. A small portion of this homogenized mixture of raw emissions and ambient air is then siphoned off through one or more sampling lines 22 and introduced into the series of analyzers 20 for detection of various pollutants or other emissions, e.g., HC, CO, $CO_2$, and $NO_x$, each analyzer essentially generating an emission profile for a specific type of pollutant.

The analyzers 20 are calibrated to detect pollutant concentration in terms of:

$$\frac{\text{Parts Pollutant}}{z \text{ Parts}} \tag{1}$$

where $z = 1{,}000{,}00$ or $100$ (depending on the pollutant)

However, since the raw emissions are mixed and homogenized with ambient air to generate a constant volume referred to as a "sample volume," and the densities (mass per sample volume) of the pollutants are known values, the output from the analyzers can be calculated in terms of mass for each second of the drive trace, specifically:

$$\text{Mass}_{Pollutant} = \frac{\text{Parts Pollutant}}{z \text{ Parts}} \times \frac{\text{Mass}}{\text{Sample Volume}} \times \text{Sample Volume} \tag{2}$$

If necessary, this calculation can be further refined to take into account environmental factors, such as the humidity.

By plotting the calculated mass at each second of the drive trace, an emissions profile for each measured pollutant emerges. The total mass then can be determined by integrating the emission profile over the duration of the test.

Finally, from the drive trace, the number of miles "driven" over the duration of the test is determined. For any particular pollutant, the specific vehicle's test "score" is calculated by dividing the total mass of the specific pollutant by the number of miles "driven." Of course, the calculated test score for the particular pollutant is compared to the defined standard for that vehicle and that pollutant. A score exceeding the defined standard is considered a failure.

The method and system of the present invention also allows for measurement of pollutant mass instead of pollutant concentration, but does not require the elaborate CVS system and associated equipment described above and as used in Maricopa County TMEI program.

Figure 2:
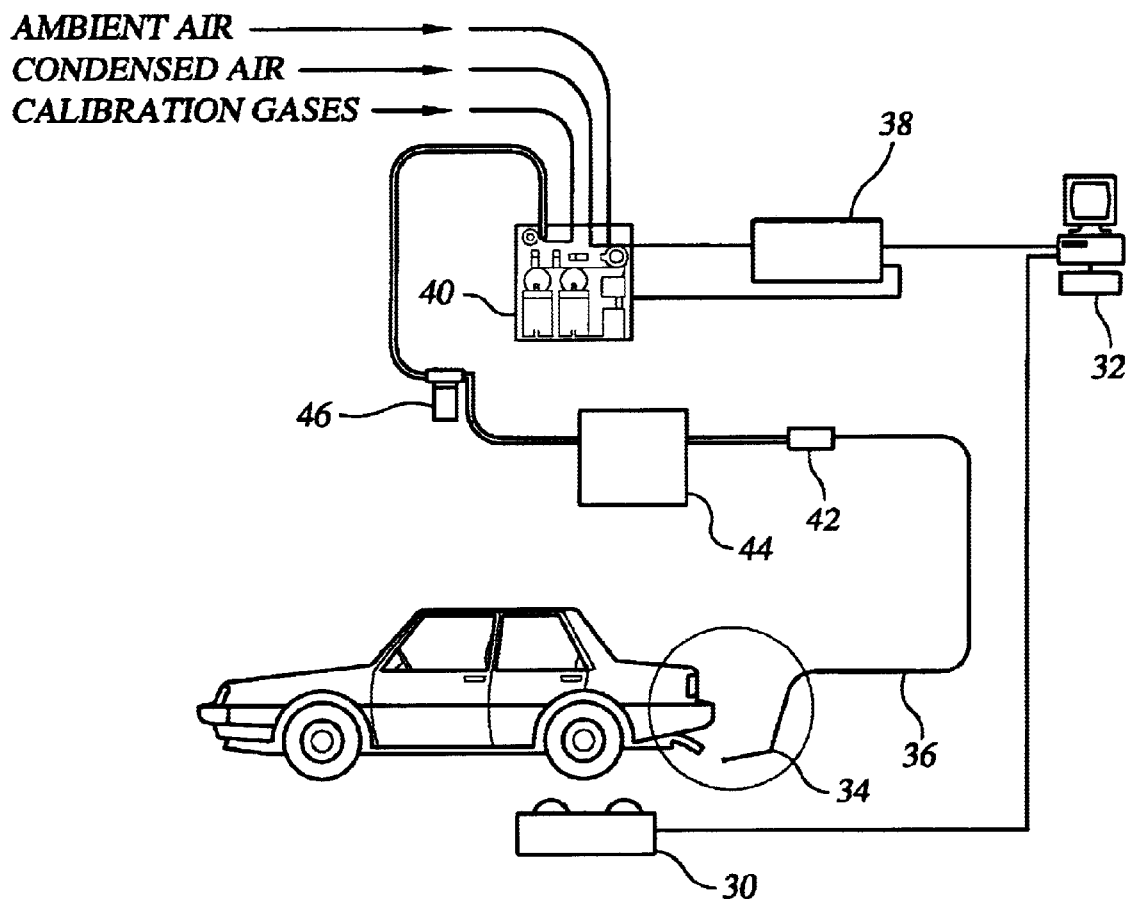
FIG. 2 is a schematic view of the equipment involved in the method and system of the present invention.
Figure 2A:
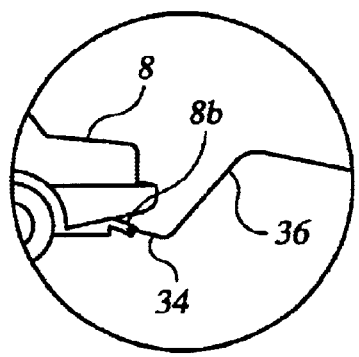
FIG. 2a is an enlarged view of the insertion of a sampling probe into the tailpipe of the vehicle to be tested in the method and system of the present invention.

Referring now to FIGS. 2 and 2a, the equipment involved in testing in accordance with the present invention: (1) a dynamometer and associated controller 30 operably connected to a computer 32 or similar microprocessor which is programmed to generate a drive trace that replicates "real world" velocities, accelerations, decelerations, and loading; (2) a narrow sample probe 34 with an associated sampling line 36; and (3) a series of analyzers 38 for detection of various pollutants or other emissions, e.g., HC, CO, $CO_2$, and $NO_x$, said analyzers 38 being in gaseous communication with a sample and calibration gas control system 40, which in turn is operably connected to the sampling line 36.

Of further note, this system preferably includes a primary filter 42 for removing extraneous materials, such as rust pieces, that are drawn into the sampling line 36. Subsequent to passing through the primary filter 42, collected samples are passed through a refrigerant dryer 44 which removes moisture from the collected sample without adversely affecting pollutant measurements. It is important to remove moisture in this manner to prevent condensation as condensation in the sampling system can affect pollutant measurement and also lead to system failure. Then, the collected sample is passed through a secondary filter 46 which removes smaller extraneous materials that were able to pass through the primary filter 42.

In this regard, the testing equipment is very similar to that commonly used in current Idle Mode, Loaded Mode and ASM test methods. Unlike TMEI testing, the sample probe 34 is a narrow instrument that is inserted deep into the tailpipe 8b of the vehicle 8, rather than fitting over and around the tailpipe, and thus draws samples that are not diluted by ambient air. The actual measured values with respect to particular pollutants are therefore measurements of pollutant concentration. Nevertheless, through appropriate computational analysis, the measurement of pollutant concentration can be converted to a measurement of pollutant mass, as is described in detail below.

Figure 3:
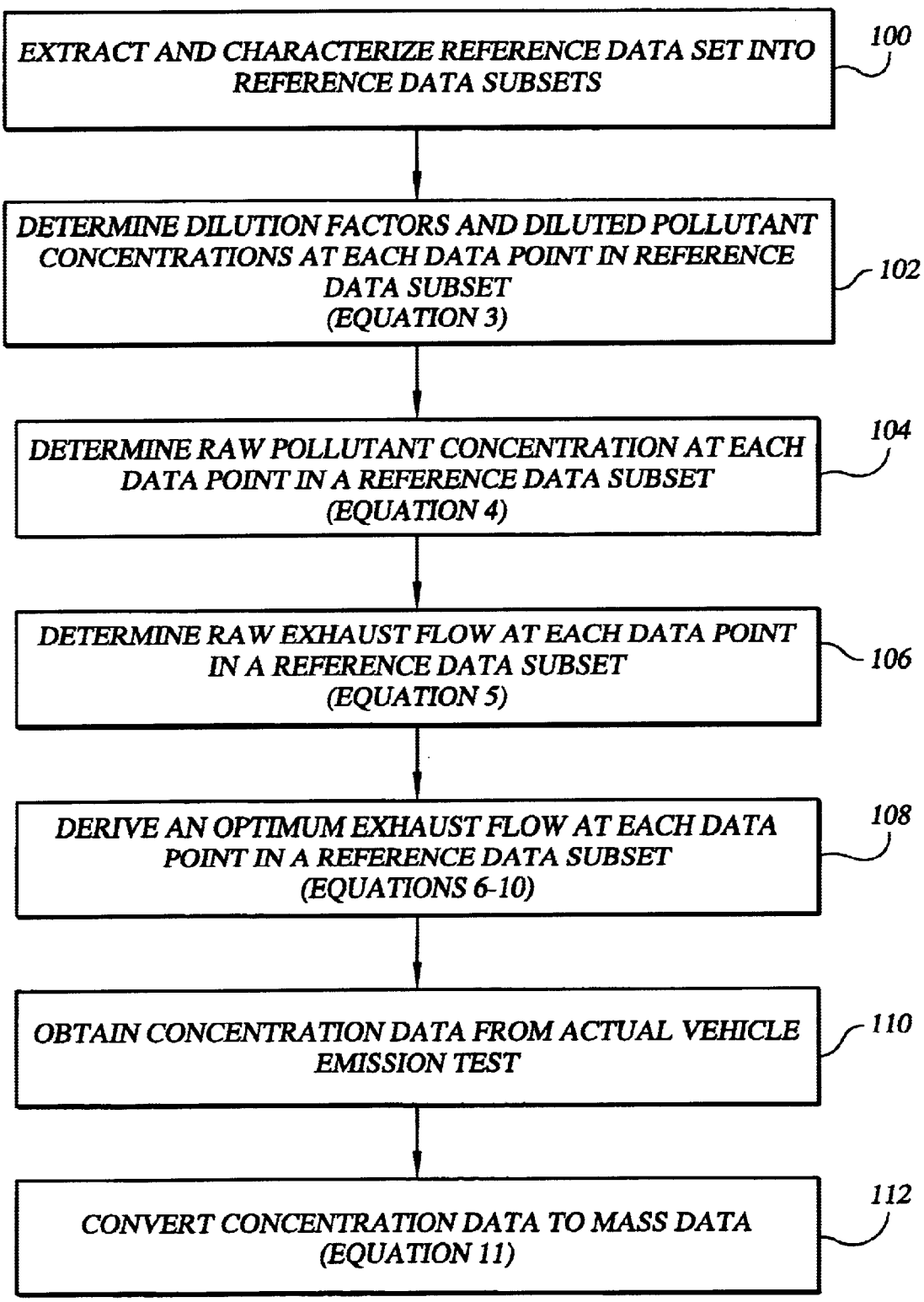
FIG. 3 is a flow chart depicting the steps involved in vehicle emission testing in accordance with the method and system of the present invention.

Referring now to FIG. 3, the method and system of the present invention is summarized in flow chart form. First, as mentioned above, calculation of the requisite characteristic exhaust flow factors requires reliance on a reference data set, such as the above-mentioned reference data set from the TMEI program in Maricopa County, Ariz.—a data set compiled through IM240 testing. Accordingly, the first step in the flow chart of FIG. 3 is the extraction and characterization of the reference data set, as indicated at block 100. In this regard, per-second drive trace test data is extracted, and this data is characterized or keyed to specific pre-selected vehicle attributes, such as: make, model, year, manufacturer, inertia weight, and engine displacement. In other words, test records are categorized and placed into reference data subsets based on certain vehicle attributes. For example, a reference data subset may include test records for all 1998 Honda Accords having a four-cylinder engine. Of course, data could be extracted in characterized in a number of ways based on various combinations of vehicle attributes as desired by the user.

Next, dilution factors and diluted pollutant concentrations can be determined for each data point (i.e., per second of the drive trace) in a particular reference data subset, as indicated at block 102 of FIG. 3. Specifically, each record in the reference data subset includes: the actual measured pollutant masses; the background concentrations, i.e., the concentration of each particular pollutant or other emission in ambient air; and the CVS flow, the rate at which the homogenized mixture of emissions and ambient air traverses the system as measured in cubic feet per second. With such data, dilution factors and diluted pollutant concentrations can be calculated by simultaneously solving the following equation for all pollutants for each data point.

$$\text{Actual Mass}_x = (\text{CVS Flow} * \text{DensF}_x) * \{DC_x - [BC_x * (1 - 1/\text{DilF})]\} \quad (3)$$

where $\text{Actual Mass}_x$ = the mass of HC, CO, $CO_2$, and $NO_x$
(as reported in the reference data set)

$\text{DensF}_x$ = Gas-specific density factor
(per 40 C.F.R. 81-99, Section 86.144-78)

$DC_x$ = Diluted Concentration $BC_x$ = Background Concentration
(as reported in the reference data set)

$\text{DilF}$ = Dilution Factor
= $13.4/(\text{Diluted } CO_2 + \text{Diluted CO} + \text{Diluted HC})$
(per IM240 and Evap Technical Guidance EPA-AA-RSPD-IM-98-1)

Then, multiplying the dilution factors by the respective diluted pollutant concentrations generates a raw pollutant concentration for each data point in the reference data subset, as indicated at block 104 of FIG. 3:

$$\text{Raw Concentration}_x = \text{DilF} * \text{Diluted Concentration}_x \quad (4)$$

With this information, and the pollutant mass data provided through the reference data subset, it is then possible to calculate a raw exhaust flow for each pollutant at each data point, as indicated at block 106 of FIG. 3, as follows:

$$\text{Raw Exhaust Flow} = \text{Actual Mass}_x / (\text{Raw Concentration}_x * \text{DensF}_x) \quad (5)$$

In practice, the actual raw exhaust flow will vary somewhat between even essentially identical vehicles, i.e. those vehicles defined by the same pre-selected attributes. Therefore, an optimum exhaust flow or "Exhaust Flow Factor," an exhaust flow that best characterizes the vehicles defined by specific attributes, must be calculated for each second of the drive trace, as indicated at block 108 of FIG. 3. Specifically, the optimum exhaust flow will be the value at which error is minimized at any particular second. In this regard, the "Predicted Mass$_x$," the mass$_x$ for a specified pollutant, is a product of the known raw concentration and the unknown Exhaust Flow Factor:

$$\text{Predicted Mass}_x = \text{Raw Concentration}_x * \text{Exhaust Flow Factor} \quad (6)$$

Since the Actual Mass$_x$ of each particular pollutant is known from the reference data, the error at any second for any particular pollutant can be determined as follows:

$$\text{Error}_x = [(\text{Predicted Mass}_x/\text{Actual Mass}_x) - 1]^2 \quad (7)$$

Substituting for Predicted Mass$_x$:

$$\text{Error}_x = \{[(\text{Raw Concentration}_x * \text{Exhaust Flow Factor})/\text{Actual Mass}_x] - 1\}^2 \quad (8)$$

Summing the error over all the pollutants and all members of the data subset produces a single error value:

$$\text{Error}_N = \sum_x \sum_{n=1}^{N} \text{Error}_{xn} \quad (9)$$

where $x$ = HC, CO, or NO$_x$ $n$ = individual test record $N$ = total number of test records in data set Substituting for Error$_x$ for each pollutant and differentiating with respect to the Exhaust Flow leads to Error$_N$ being at a minimum when:

Exhaust Flow Factor = (10)

$$\frac{\sum_x \sum_{n=1}^{N} (\text{Raw Concentration}_{xn}/\text{Actual Mass}_{xn})}{\sum_x \sum_{n=1}^{N} (\text{Raw Concentration}_{xn}/\text{Actual Mass}_{xn})^2}$$

where x=HC, CO, or NO$_x$ n=individual test record

N=total number of test records in data set

In short, through the derivation set forth in equations (6)–(10), it becomes clear that the Exhaust Flow Factor, the exhaust flow that best characterizes a vehicle defined by specific attributes, is a function of the raw concentration and actual mass of each pollutant at each second of the drive trace.

Once the Exhaust Flow Factor has been determined for vehicles defined by the same pre-selected attributes for each second of the drive trace, the concentration of a specific pollutant at any second of the drive trace can be reported in terms of mass. Specifically, as indicated at block 110 of FIG. 3, the measured pollutant concentration data is obtained through testing as described above with reference to FIG. 2 and 2A. As indicated at block 112 of FIG. 3, the concentration data is converted to mass data as follows:

$$\text{Mass}_{Pollutant} = \frac{\text{Parts Pollutant}}{z\ \text{Parts}} \times \frac{\text{Mass}}{\text{Volume}} \times \text{Exhaust Flow Factor} \quad (11)$$

where (Parts Pollutant/z Parts) = concentration as measured by the pollutant analyzer (Mass/Volume) = pollutant density (a known value)

Then, as with TMEI, by plotting the calculated mass at each second of the drive trace, an emissions profile for each measured pollutant emerges. The total mass then can be determined by integrating the emission profile over the duration of the test.

Finally, the number of miles "driven" over the duration of the test is determined. For any particular pollutant, the specific vehicle's test "score" is calculated by dividing the total mass of the specific pollutant by the number of miles "driven." Of course, the calculated test score for the particular pollutant is compared to the defined standard for that vehicle and that pollutant. A score exceeding the defined standard is considered a failure.

It is contemplated and preferred that all required computation is accomplished through a digital computer program. With benefit of the foregoing description, such programming is readily accomplished by one of ordinary skill in the art using known programming languages and techniques.

As a further refinement, it is contemplated that further optimization of the conversion from pollutant concentration to pollutant mass can be achieve by calculating pollutant-specific multipliers that reduce, when possible, the number of false passes and false failures to values below user-specified thresholds.

Therefore, through implementation of the method and system of the present invention, pollutant mass, instead of pollutant concentration, may be determined without the high implementation, operating, and maintenance costs common to prior art testing methods and systems.

It will be obvious to those skilled in the art that modifications may be made to the preferred embodiments described herein without departing from the spirit and scope of the present invention.

What is claimed is:

1. A method for determining the mass of a pollutant in an emissions sample obtained form a particular vehicle to ascertain whether such pollutant mass exceeds a defined standard, comprising the steps of:

extracting the emissions sample from the particular vehicle as it is operated over a testing period comprised of a plurality of discrete time intervals;

deriving a standard exhaust flow factor from a reference data set at each discrete time interval for the particular vehicle based on certain vehicle attributes;

analyzing the emissions sample extracted from the particular vehicle to measure the concentration of the pollutant in said sample at each discrete time interval; and determining the mass of the pollutant at each discrete time interval by multiplying the standard exhaust flow factor by the measured concentration of the pollutant by the known density of the pollutant.

2. A method as recited in claim 1, and further comprising the steps of:

plotting the mass of the pollutant over the testing period to generate an emission profile; and integrating the emission profile over the testing period to determine the total mass of the pollutant.

3. A method as recited in claim 2, and further comprising the steps of:

dividing the total mass of the pollutant by the distance traveled over the testing period to calculate a test score for the pollutant; and comparing said test score against a defined standard, wherein a test score exceeding the defined standard is considered a failure.

4. A method as recited in claim 1, in which the derivation of the standard exhaust flow factor comprises the following sub-steps:

characterizing the reference data set, which is comprised of a plurality of actual emission testing records based on the certain vehicle attributes, placing each testing record into at least one reference data subset defined by pre-selected vehicle attributes;

selecting a reference data subset based on the vehicle attributes of the particular vehicle from which the emissions sample is extracted;

determining a dilution factor and a diluted pollutant concentration for each data point in the reference data subset, each said data point corresponding with a discrete time interval of the testing period for the particular vehicle from which the emissions sample is extracted;

determining a raw pollutant concentration for each data point in the reference data subset by multiplying the dilution factor by the diluted pollutant concentration; and determining the standard exhaust flow factor for the pollutant for each data point in the reference data subset, which is a function of the raw pollutant concentration, a standard density factor, and the actual measured mass of the pollutant as provided through the reference data set.

5. A method as recited in claim 1, in which the extraction and analysis of the emissions sample from the particular vehicle is accomplished by:

a narrow sample probe for insertion into the tailpipe of the particular vehicle;

a sampling line operably connected to said sample probe; and an analyzer for detection of the pollutant associated with and in gaseous communication with a sample and calibration gas control system, said control system being operably connected to the sampling line.

6. A method as recited in claim 1, in which the certain vehicle attributes are selected from a group that includes: make, model, year, manufacturer, inertia weight, and engine displacement.

* * * * *